(12) United States Patent
Kim

(10) Patent No.: US 12,430,872 B2
(45) Date of Patent: Sep. 30, 2025

(54) METHOD FOR DETECTING REFLECTIVITY INFORMATION OF DEEP LEARNING-BASED VIRTUAL ENVIRONMENT POINT CLOUD DATA, AND ELECTRONIC DEVICE PERFORMING SAME

(71) Applicant: NAVER LABS CORPORATION, Seongnam-si (KR)

(72) Inventor: Nam-il Kim, Seongnam-si (KR)

(73) Assignee: NAVER LABS CORPORATION, Seongnam-si (KR)

( * ) Notice: Subject to any disclaimer, the term of this patent is extended or adjusted under 35 U.S.C. 154(b) by 867 days.

(21) Appl. No.: 17/698,452

(22) Filed: Mar. 18, 2022

(65) Prior Publication Data

US 2022/0207858 A1    Jun. 30, 2022

Related U.S. Application Data

(63) Continuation of application No. PCT/KR2019/015240, filed on Nov. 11, 2019.

(30) Foreign Application Priority Data

Nov. 7, 2019    (KR) .................. 10-2019-0141344

(51) Int. Cl.
*G06V 10/56* (2022.01)
*G06T 7/70* (2017.01)
*G06T 7/90* (2017.01)
*G06V 10/60* (2022.01)
*G06V 10/764* (2022.01)

(Continued)

(52) U.S. Cl.
CPC ................ *G06V 10/56* (2022.01); *G06T 7/70* (2017.01); *G06T 7/90* (2017.01); *G06V 10/60* (2022.01); *G06V 10/764* (2022.01); *G06V 10/766* (2022.01); *G06V 10/82* (2022.01); *G06V 20/56* (2022.01); *G06T 2207/10024* (2013.01);

(Continued)

(58) Field of Classification Search
None
See application file for complete search history.

(56) References Cited

U.S. PATENT DOCUMENTS

| 9,460,553 B2 * | 10/2016 | Tabellion | .............. G06T 15/506 |
| 2019/0052844 A1 * | 2/2019 | Droz | ..................... G01S 17/931 |

(Continued)

FOREIGN PATENT DOCUMENTS

| KR | 1020170127350 | 11/2017 |
| KR | 1020190001668 | 1/2019 |

(Continued)

*Primary Examiner* — Helen Zong
(74) *Attorney, Agent, or Firm* — GREER BURNS & CRAIN, LTD.

(57) ABSTRACT

An electronic device and an operational method thereof according to various embodiments relate to detection of reflectivity information of deep learning-based virtual environment point cloud data, and that is configured such that: image data and point cloud data are acquired; physical information including location information and color information for each point of point cloud data are detected on the basis of the image data; and deep learning for the point cloud data is performed on the basis of the physical information to detect reflectivity information of the point cloud data.

17 Claims, 11 Drawing Sheets

(51) Int. Cl.
    *G06V 10/766*     (2022.01)
    *G06V 10/82*     (2022.01)
    *G06V 20/56*     (2022.01)

(52) U.S. Cl.
    CPC ............... *G06T 2207/10028* (2013.01); *G06T 2207/20081* (2013.01); *G06T 2207/30252* (2013.01)

(56) References Cited

U.S. PATENT DOCUMENTS

| | | | |
|---|---|---|---|
| 2019/0132572 A1* | 5/2019 | Shen | G01S 7/4811 |
| 2020/0302189 A1* | 9/2020 | Shu | G06V 10/82 |
| 2021/0255326 A1* | 8/2021 | Amano | G01S 17/89 |
| 2021/0263167 A1* | 8/2021 | Chen | G01C 21/30 |
| 2021/0370968 A1* | 12/2021 | Xiao | G01S 7/4808 |
| 2022/0110729 A1* | 4/2022 | Glinec | G01J 3/508 |
| 2022/0130074 A1* | 4/2022 | Zheng | G06T 9/00 |
| 2022/0262128 A1* | 8/2022 | Nakamura | G08G 1/166 |
| 2022/0417557 A1* | 12/2022 | Oh | H04N 19/597 |
| 2023/0048725 A1* | 2/2023 | Barbour | G06F 18/214 |
| 2023/0186476 A1* | 6/2023 | Ghazvinian Zanjani | G06T 7/62 706/20 |
| 2024/0188688 A1* | 6/2024 | Lee | A61B 5/1074 |

FOREIGN PATENT DOCUMENTS

| | | |
|---|---|---|
| KR | 1020190095592 | 8/2019 |
| WO | 2019194424 A1 | 3/2019 |

* cited by examiner

METHOD FOR DETECTING REFLECTIVITY INFORMATION OF DEEP LEARNING-BASED VIRTUAL ENVIRONMENT POINT CLOUD DATA, AND ELECTRONIC DEVICE PERFORMING SAME

CROSS-REFERENCE TO RELATED APPLICATIONS

This is a continuation application of International Application No. PCT/KR2019/015240, filed Nov. 11, 2019, which claims the benefit of Korean Patent Application No. 10-2019-0141344, filed Nov. 7, 2019.

BACKGROUND OF THE INVENTION

Technical Field

One or more example embodiments of the following description relate to a method of detecting reflectivity information of deep learning-based virtual environment point cloud data and an electronic device performing the method.

Related Art

In autonomous driving, a vehicle travels on the road by itself without a driver directly driving the vehicle. To implement such autonomous driving, various sensors, for example, a camera, a light detection and ranging (LIDAR) sensor, a radio detecting and ranging (RADAR) sensor, and an ultrasonic sensor, are used and are attached to the vehicle (or other object). The LIDAR sensor collects information related to topographical features in the surrounding environment of the object by using a laser. The LIDAR sensor is not affected by a change in illumination, and such a sensor is important for implementation of autonomous driving in terms of acquiring not only location information about an object around the vehicle but also reflectivity information according to an expression of the object and the atmosphere.

However, it is difficult to tag (i.e., perform annotation of) object-related information from point cloud data that is generated through the LIDAR sensor in that a complex procedure for tagging needs to be performed for each of all points of the point cloud data and an additional sensor needs to be used for accurate tagging. That is, in tagging the object-related information from the point cloud data that is generated through the LIDAR sensor, there are difficulties in three aspects corresponding to complexity, cost, and time. Such difficulties cause issues that act as a bottleneck in developing a deep learning algorithm for the point cloud data.

To solve the aforementioned issues, research for tagging object-related information based on virtual point cloud data is in progress. That is, even without using an actual LIDAR sensor, research for tagging object-related information is being conducted. However, the virtual point cloud data does not provide reflectivity information. Therefore, there is a need for a method to estimate reflectivity information of virtual point cloud data.

BRIEF SUMMARY OF THE INVENTION

Various example embodiments provide an electronic device that estimates reflectivity information of virtual point cloud data and an operating method thereof.

Various example embodiments provide an electronic device that improves accuracy in tagging object-related information based on virtual point cloud data and an operating method thereof.

An operating method of an electronic device according to various example embodiments may include acquiring image data and point cloud data; detecting physical information that includes location information and color information about each point of the point cloud data based on the image data; and detecting reflectivity information of the point cloud data by performing deep learning on the point cloud data based on the physical information.

An electronic device according to various example embodiments may include a memory and a processor configured to connect to the memory and to acquire image data and point cloud data.

According to various example embodiments, the processor may be configured to detect physical information that includes location information and color information about each point of the point cloud data based on the image data and to detect reflectivity information of the point cloud data by performing deep learning on the point cloud data based on the physical information.

A non-transitory computer-readable storage medium according to various example embodiments may store one or more programs to perform acquiring image data and point cloud data; detecting physical information that includes location information and color information about each point of the point cloud data based on the image data; and detecting reflectivity information of the point cloud data by performing deep learning on the point cloud data based on the physical information.

According to various example embodiments, an electronic device may estimate reflectivity information of virtual point cloud data. Therefore, the electronic device may tag information related to an object of a real environment using real image data and virtual point cloud data. That is, the electronic device may accurately tag object-related information even without using an actual light detection and ranging (LIDAR) sensor.

DETAILED DESCRIPTION OF THE INVENTION

Hereinafter, some example embodiments will be described with reference to the accompanying drawings.

An electronic device according to various example embodiments may be implemented to enable autonomous driving. According to an example embodiment, the electronic device may independently perform autonomous driving. According to another example embodiment, the electronic device may be mounted to an external device capable of performing autonomous driving. The electronic device may be attached to or otherwise associated with various types of devices. According to various example embodiments, the electronic device may tag information related to an object of a real environment using real image data and virtual point cloud data. Therefore, the electronic device may estimate reflectivity information of point cloud data and may use the estimated reflectivity information to tag object-related information. Therefore, the electronic device may accurately tag object-related information without using an actual light detection and ranging (LIDAR) sensor.

Figure 1:
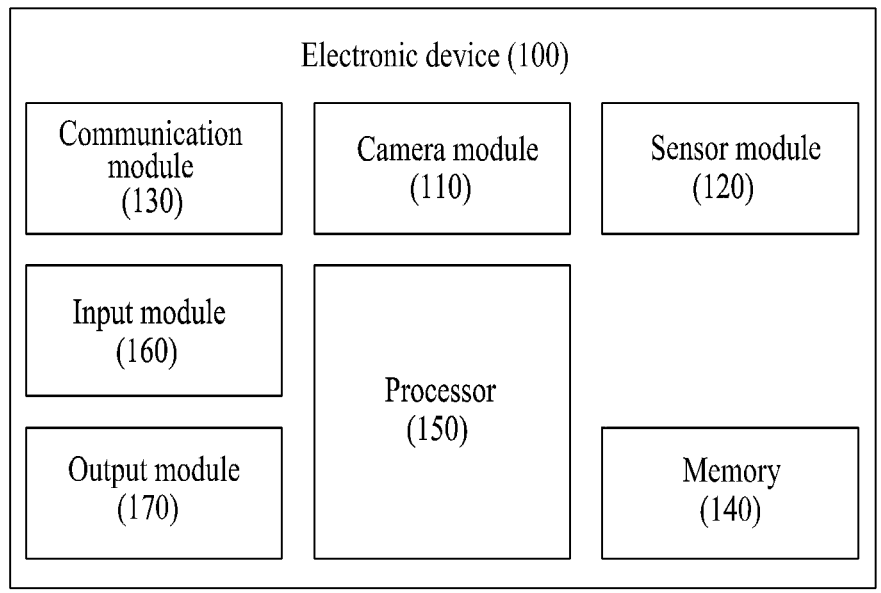
FIG. 1 illustrates an electronic device according to various example embodiments.

FIG. 1 illustrates an electronic device 100 according to various example embodiments.

Referring to FIG. 1, the electronic device 100 according to various example embodiments may include at least one of a camera module 110, a sensor module 120, a communication module 130, a memory 140, a processor 150, an input module 160, and an output module 170. In some example embodiments, at least one of the components of the electronic device 100 may be omitted, or at least one other component may be added to the electronic device 100.

The camera module 110 may take an external image of the electronic device 100. Here, the camera module 110 may be installed at a preset location on the electronic device 100, and may take an image in one direction, for example, from the front of the electronic device 100. The camera module 110 may generate image data about the external image of the electronic device 100. For example, the camera module 110 may include at least one of a lens, at least one image sensor, an image signal processor, and a flash.

The sensor module 120 may sense a state of the electronic device 100 or an external environment of the electronic device 100. The sensor module 120 may generate sensing data about the state of the electronic device 100 or the external environment of the electronic device 100.

The communication module 130 may support communication between the electronic device 100 and an external device (not shown). Here, the communication module 130 may include at least one of a wireless communication module and a wired communication module. According to an example embodiment, the wireless communication module may support at least one of cellular communication and near field communication. According to another example embodiment, the wireless communication module may support communication with a global navigation satellite system (GNSS). For example, the GNSS may include a global positioning system (GPS).

The memory 140 may store at least one of data and a program used by at least one of the components of the electronic device 100. For example, the memory 140 may include at least one of a volatile memory and a nonvolatile memory. The memory 140 may store virtual point cloud data. Here, the point cloud data refers to data related to a plurality of points, and may include location information about each point, such as, three-dimensional (3D) location coordinates.

The processor 150 may control at least one of the components of the electronic device 100, and may perform data processing or arithmetic operations by executing the program of the memory 140. The processor 150 may acquire image data through the camera module 110. The processor 150 may acquire sensing data through the sensor module 120. Here, the processor 150 may acquire point cloud data from the memory 140. The processor 150 may detect reflectivity information of point cloud data by performing deep learning on the point cloud data. For example, the processor 150 may perform deep learning based on at least one model chosen from among PointNET, ResNet, SqueezeNet, Nuet (backbone) and gating mechanism, and GAN.

According to various example embodiments, the processor 150 may detect physical information about each point of the point cloud data. The physical information may include a plurality of physical elements, and may include at least one of location information about each point, color information about each point, classification information, of a surface for each point, and angle information about a plane that includes each point and surrounding points. For example, the location information may include 3D location coordinates (e.g., (x, y, z)), the color information may include 3D color elements (e.g., RGB or Lab), the classification information may include a one-dimensional (1D) classification element (e.g., 0 (vehicle), 1 (pedestrian), 2 (two-wheeled driven vehicle, such as a bicycle)), and the angle information may include 3D directional elements (e.g., 3D normal). For example, the physical information may include a total of 10 physical elements.

According to various example embodiments, the processor 150 may detect reflectivity information of point cloud data by performing deep learning on the point cloud data based on physical information. Here, the reflectivity information may be estimated as a sum of class information about each of a plurality of classes classified at a predetermined distance and regression information of the rest thereof. For example, the reflectivity information may be estimated within a range of 0 or more and 1 or less.

The input module 160 may receive an instruction or data to be used for at least one of the components of the electronic device 100 from outside of the electronic device 100. For example, the input module 160 may include at least one of a microphone, a mouse, and a keyboard.

The output module 170 may provide information to the outside of the electronic device 100. Here, the output module 170 may include at least one of a display module and an audio module. The display module may visually output information. For example, the display module may include at least one of a display, a hologram device, and a projector. The audio module may output a sound. For example, the audio module may include a speaker.

The electronic device 100 according to various example embodiments may include the camera module 110, the memory 140, and the processor 150. The processor 150 is preferably configured to connect to each of the camera module 110 and the memory 140, to acquire image data through the camera module 110, and to acquire point cloud data stored in the memory 140.

According to various example embodiments, the processor 150 may be configured to detect physical information that includes location information and color information about each point of the point cloud data based on the image data, and to detect reflectivity information of the point cloud data by performing deep learning on the point cloud data based on the physical information.

According to various example embodiments, the processor 150 may be configured to detect location information about each point of the point cloud data, and to detect color information of at least a portion of the point cloud data by overlapping the image data and the point cloud data.

According to various example embodiments, the processor 150 may be configured to detect at least a portion of the point cloud data as first point cloud data having color information, and to detect color information of at least a portion of second point cloud data of the rest of the point cloud data based on location information and color information of the first point cloud data.

According to various example embodiments, the processor 150 may be configured to generate a map using the first point cloud data, to estimate a location of each point of the second point cloud data of the rest of the point cloud data based on the map, to assign color information of a point cloud of the first point cloud data within a predetermined distance from at least one point of the second point cloud data to the at least one point, and to convert the at least one point to the first point cloud data and thereby update the map.

According to various example embodiments, the physical information may further include at least one of classification information of a surface for each point of the point cloud data and angle information about a plane that includes each point and surrounding points in the point cloud data.

According to various example embodiments, the classification information may include a 1D element, and each of the location information, the color information and the angle information may include 3D elements.

According to various example embodiments, the processor 150 may be configured to convert the point cloud data to an image data format based on the physical information, and to detect the reflectivity information by performing deep learning on the converted point cloud data.

According to various example embodiments, the reflectivity information may be estimated as a sum of the class information of each of a plurality of classes classified at a predetermined distance and regression information of the rest thereof.

According to various example embodiments, the reflectivity information may be estimated within a range of 0 or more and 1 or less.

Figure 2:
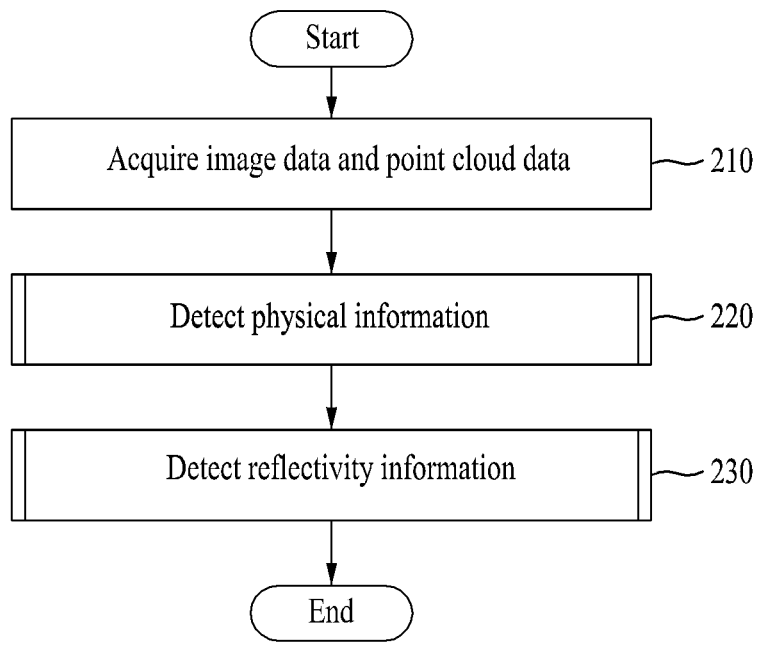
FIG. 2 is a flowchart illustrating an operating method of an electronic device according to various example embodiments.
Figure 3:
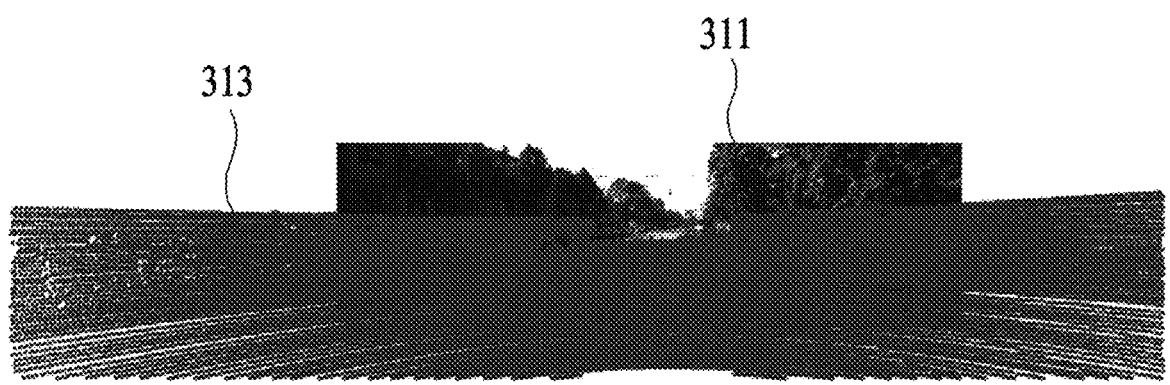
FIG. 3 illustrates an operation of acquiring image data and point cloud data of FIG. 2.

FIG. 2 is a flowchart illustrating an operating method of the electronic device 100 according to various example embodiments. FIG. 3 illustrates an operation of acquiring image data and point cloud data of FIG. 2.

Referring to FIG. 2, in operation 210, the electronic device 100 acquires image data and point cloud data. The processor 150 may acquire the image data through the camera module 110 and may the acquire point cloud data from the memory 140. For example, the processor 150 may acquire the point cloud data corresponding to the image data based on a location of the electronic device 100. Practically, only a portion of the point cloud data collected by a LIDAR sensor may overlap the image data. This is due to a difference between the shooting range of the camera module 110 and the sensing range of the LIDAR sensor. For example, referring to FIG. 3, for the front of the electronic device 100, image data 311 may overlap a portion of point cloud data 313.

In operation 220, the electronic device 100 detects physical information of the point cloud data. Here, the processor 150 may detect the physical information about each point of the point cloud data. The physical information may include a plurality of physical elements, and may include at least one of location information about each point, color information about each point, classification information of a surface for each point, and angle information about a plane that includes each point and surrounding points. For example, the location information may include 3D location coordinates (e.g., (x, y, z)), the color information may include 3D color elements (e.g., RGB or Lab), the classification information may include a 1D classification element (e.g., 0 (vehicle), 1 (pedestrian), 2 (two-wheeled driven vehicle, such as a bicycle)), and the angle information may include 3D directional elements (e.g., 3D normal). For example, the physical information may include a total of 10 physical elements.

The processor 150 may detect location information about each point from the point cloud data. The processor 150 may detect color information about at least a portion of the point cloud data based on the image data. Here, as described below with reference to FIG. 4A, the processor 150 may detect color information about at least a portion of the point cloud data. The processor 150 may classify points of the point cloud data for each object using a detection unit (not shown) or a segmentation unit (not shown) and may detect classification information about the corresponding object. Here, the classification information may correspond to a surface material of the corresponding object. The processor 150 may detect angle information based on directionality for the plane that includes each point and surrounding points in the point cloud data.

Figure 4A:
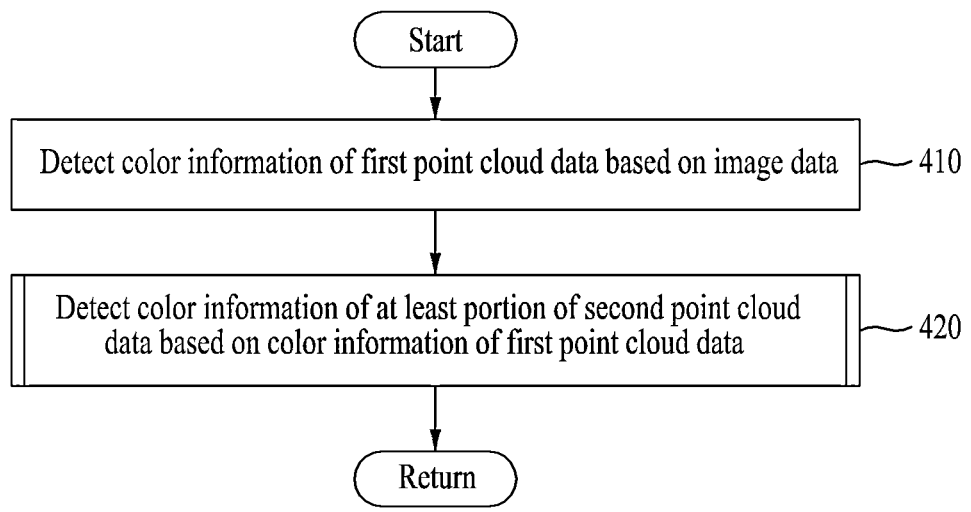
FIG. 4A is a flowchart illustrating an operation of detecting physical information of FIG. 2.

FIG. 4A is a flowchart illustrating an operation of detecting physical information of FIG. 2. In detail, FIG. 4A is a flowchart illustrating the operation of detecting color information of each point of point cloud data.

Referring to FIG. 4A, in operation 410, the electronic device 100 detects color information of first point cloud data based on image data. Here, the processor 150 may detect location information about each point of the point cloud data. The processor 150 may overlap the image data and the point cloud data. Through this, the processor 150 may detect at least a portion of the point cloud data as the first point cloud data having the color information and may detect the rest of the point cloud data as second point cloud data. Also, the processor 150 may detect the color information about each point of the first point cloud data.

In operation 420, the electronic device 100 may detect color information of at least a portion of the second point cloud data based on the color information of the first point cloud data. The processor 150 may detect the color information of at least a portion of the second point cloud data based on location information and color information about each point of the first point cloud data. Here, the processor 150 may detect at least one point in the second point cloud data based on location information about each point of the first point cloud data. The processor 150 may detect color information about at least one point in the second point cloud data using color information about at least one point in the first point cloud data.

Figure 4B:
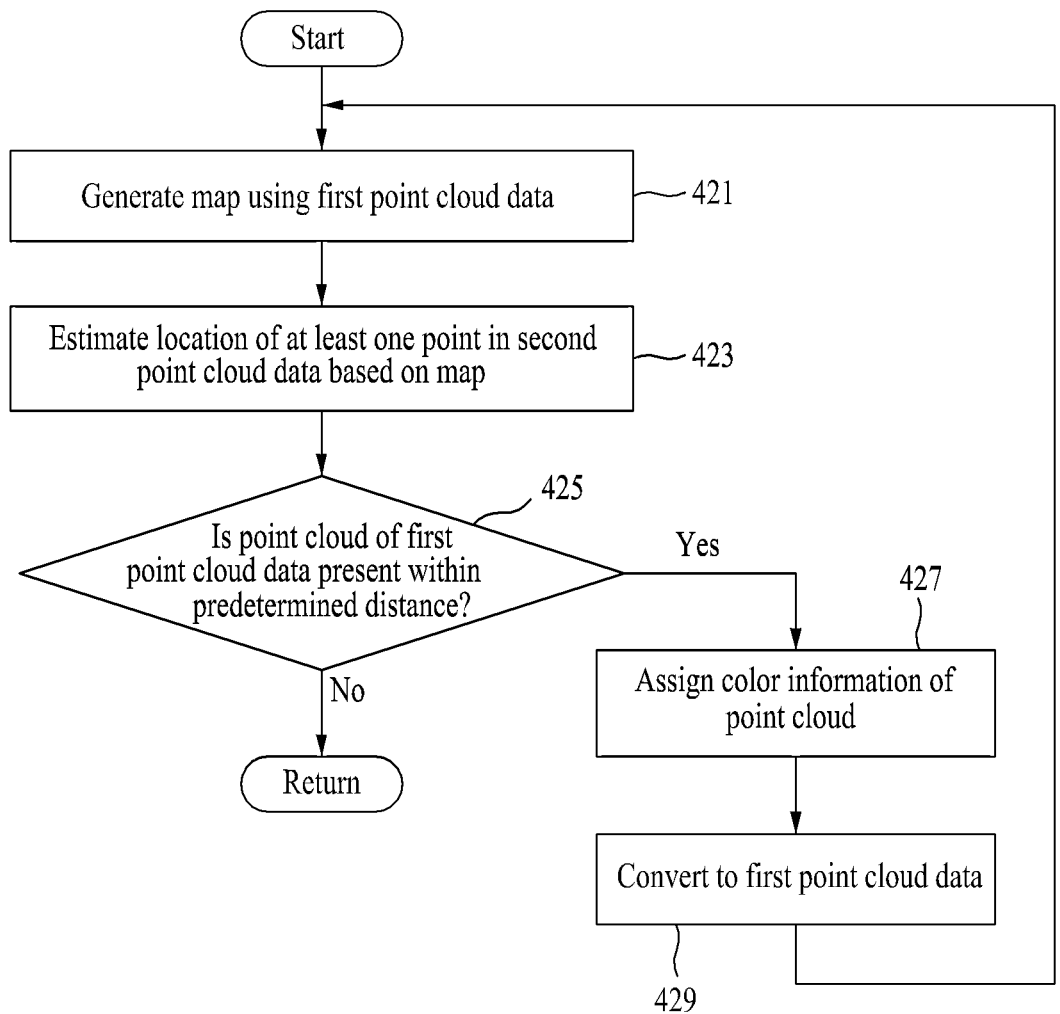
FIG. 4B is a flowchart illustrating an operation of detecting color information of at least a portion of second point cloud data of FIG. 4A.

FIG. 4B is a flowchart illustrating an operation of detecting color information of at least a portion of second point cloud data of FIG. 4A. FIGS. 5(*a*) and 5(*b*) illustrate an operation of detecting color information of at least a portion of second point cloud data.

Figure 5A:
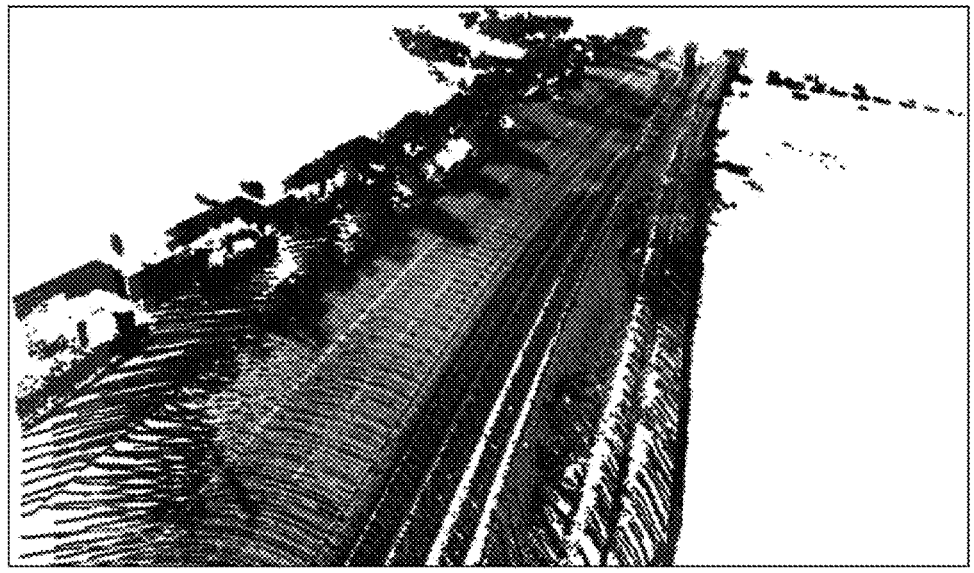
FIGS. 5($a$) and 5($b$) illustrate an operation of detecting color information of at least a portion of second point cloud data.

Referring to FIG. 4B, in operation 421, the electronic device 100 generates a map using the first point cloud data. Here, the processor 150 may generate the map based on the color information of the first point cloud data. In detail, the processor 150 may apply the color information about each point of the first point cloud data to correspond to the location information about each point of the first point cloud data. For example, referring to FIG. 5(a), the processor 150 generates a map. The portion expressed with dark (darker) points in FIG. 5(a) is a point cloud without color information and may represent at least a portion of the second point cloud data.

In operation 423, the electronic device 100 estimates a location of at least one point in the second point cloud data based on the map. The processor 150 may estimate a location of at least one point in the second point cloud data based on the location information about each point of the first point cloud data. According to an example embodiment, the processor 150 estimates a location of at least one point in the second point cloud data from the location information about each point of the first point cloud data based on a relative location between points in the point cloud data. According to another example embodiment, the processor 150 estimates a location of at least one point in the second point cloud data from the location information about each point of the first point cloud data based on satellite information received from a GNSS through the communication module 130. According to still another example embodiment, the processor 150 may estimate a location of at least one point in the second point cloud data from the location information about each point of the first point cloud data based on a relative location between points in the point cloud data and satellite information received from the GNSS through the communication module 130.

In operation 425, the electronic device 100 determines whether a point cloud of the first point cloud data is present within a predetermined distance from at least one point of the second point cloud data. The processor 150 may compare location information about each point of the first point cloud data and a location of at least one point in the second point cloud data. Through this, the processor 150 may determine whether the point cloud of the first point cloud data is present within the predetermined distance from at least one point of the second point cloud data. For example, the predetermined distance may be about 10 cm.

When the point cloud of the first point cloud data is determined to be present within the predetermined distance from at least one point of the second point cloud data in operation 425, the electronic device 100 may assign color information of the point cloud of the first point cloud data to the at least one point of the second point cloud data in operation 427. The processor 150 may identify the point cloud of the first point cloud data within the predetermined distance from at least one point of the second point cloud data. The processor 150 may assign the color information of the point cloud of the first point cloud data to the at least one point of the second point cloud data. For example, when the point cloud identified from the first point cloud data includes a plurality of points, the processor 150 may assign color information amount a point nearest to the at least one point of the second point cloud data. As another example, the processor 150 may assign average color information of the point cloud identified from the first point cloud data.

Figure 5B:
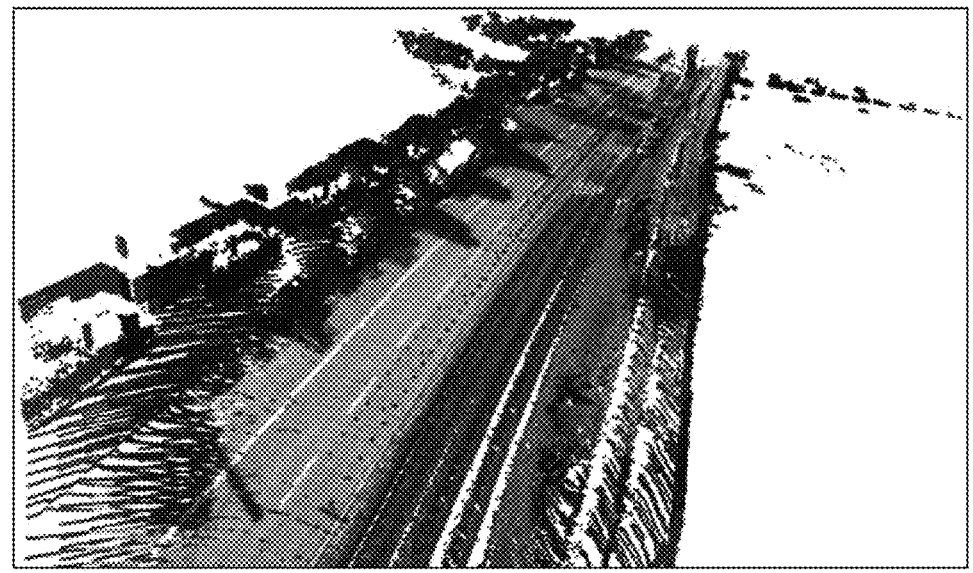

In operation 429, the electronic device 100 converts at least one point of the second point cloud data to the first point cloud data. The processor 150 may convert at least one point having color information in the second point cloud data to the first point cloud data. Subsequently, the electronic device 100 may return to operation 421. Through this, the electronic device 100 may perform again at least a portion of operations 421 to 429. Here, in operation 421, the electronic device 100 may update the map using the first point cloud data. That is, since the first point cloud data is modified by at least one point of the second point cloud data, the processor 150 may update the map using the first point cloud data. For example, the processor 150 may update the map as shown in FIG. 5(b). In FIG. 5(b), a portion expressed with dark (darker) points refers to a point cloud without color information and may represent at least a portion of the second point cloud data. Compared to FIG. 5(a), a portion expressed with dark (darker) points in FIG. 5(b) has been reduced.

Meanwhile, when it is determined that a point cloud of the first point cloud data is absent within a predetermined distance from at least one point of the second point cloud data in operation 425, the electronic device 100 may return to FIG. 2. That is, the processor 150 determines that the color information of the second point cloud data can no longer be detected, and the returns to the steps of FIG. 2.

Referring again to FIG. 2, in operation 230, the electronic device 100 detects reflectivity information of the point cloud data. The processor 150 may detect the reflectivity information of the point cloud data by performing deep learning on the point cloud data based on the physical information. For example, the processor 150 may perform deep learning based on at least one model chosen from among PointNET, ResNet, SqueezeNet, Nuet (backbone) and gating mechanism, and GAN. The reflectivity information may be estimated as a normalized value. Here, the reflectivity information may be estimated as the sum of class information about each of a plurality of classes classified at a predetermined distance and regression information of the rest thereof. For example, the reflectivity information may be estimated within a range of 0 or more and 1 or less.

Figure 6:
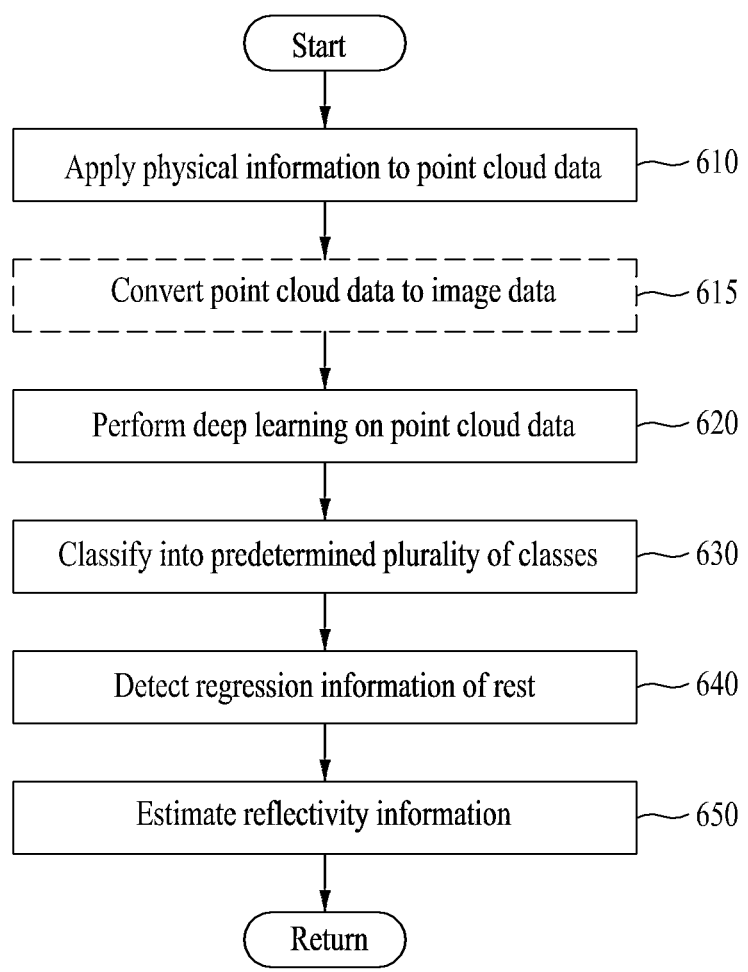
FIG. 6 is a flowchart illustrating an operation of detecting reflectivity information of FIG. 2.
Figure 7A:
FIGS. 7($a$) and 7($b$) illustrate an operation of detecting reflectivity information of FIG. 2.
Figure 7B:
Figure 8A:
FIGS. 8($a$)-8($d$), 9($a$)-9($d$), 10($a$)-10($d$), and 11($a$)-11($d$) illustrate an operation effect of an electronic device according to various example embodiments.
Figure 8B:
Figure 8C:
Figure 8D:
Figure 9A:
Figure 9B:
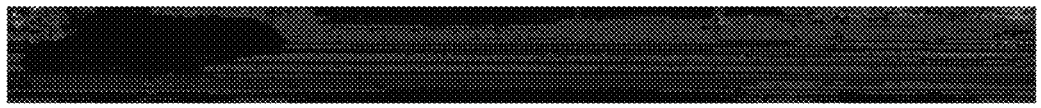
Figure 9C:
Figure 9D:
Figure 10A:
Figure 10B:
Figure 10C:
Figure 10D:
Figure 11A:
Figure 11B:
Figure 11C:
Figure 11D:

FIG. 6 is a flowchart illustrating an operation of detecting reflectivity information of FIG. 2. FIGS. 7(a) and 7(b) illustrate an operation of detecting reflectivity information of FIG. 2.

Referring to FIG. 6, in operation 610, the electronic device 100 applies physical information to point cloud data. The processor 150 preferably applies the physical information to each point of the point cloud data. The physical information may include a plurality of physical elements and may include at least one of location information about each point, color information about each point, classification information of a surface for each point, and angle information about a plane that includes each point and surrounding points. For example, the location information may include 3D location coordinates (e.g., (x, y, z)), the color information may include 3D color elements (e.g., RGB or Lab), the classification information may include a 1D classification element (e.g., 0 (vehicle), 1 (pedestrian), 2 (two-wheeled driven vehicle, such as a bicycle)), and the angle information may include 3D directional elements (e.g., 3D normal). For example, the physical information may include a total of 10 physical elements. For example, the processor 150 may accumulate and input physical elements for each point of the point cloud data using a channel.

According to an example embodiment, in operation 615, the electronic device 100 converts the point cloud data to image data. The processor 150 may convert the point cloud data to an image data format. Here, the processor 150 may convert the point cloud data to the image data, for example, a spherical image and a range image, through a circular coordinate system. For example, the point cloud data converted to the image data format may be represented as illustrated in FIG. 7(a). According to another example embodiment, the electronic device 100 may maintain the point cloud data without performing operation 615. The processor 150 may maintain the point cloud data in a current form.

In operation 620, the electronic device 100 may perform deep learning on the point cloud data. The processor 150 may perform deep learning on the point cloud data based on at least one model. For example, the processor 150 may perform deep learning using a scale pyramid scheme of converting intermediate result values for input to various sizes and summing the same. According to an example embodiment, when the point cloud data is converted to the image data format in operation 615, the processor 150 performs deep learning based on at least one model among ResNet, SqueezeNet, Nuet (backbone) and gating mechanism, and GAN. According to another example embodiment, when the point cloud data is maintained in operation 615, the processor 150 performs deep learning based on a model of PointNET.

In operation 630, the electronic device 100 classifies the point cloud data into a predetermined plurality of classes. Classes may be classified at a constant (the same) distance D within a predetermined range. For example, within the range of 0 or more and 1 or less, each class may have a distance of 0.1. Each class may be represented as each piece of class information (C*D) and the class information (C*D) may be determined as a multiplication of an identification value (classification value) (C) and a distance (D) of each class. Through this, the processor 150 may detect class information (C*D) about each point of the point cloud data. In operation 640, the electronic device 100 may detect regression information (R) of the rest of the point cloud data. The processor 150 may detect regression information (R) about each point of the point cloud data.

In operation 650, the electronic device 100 estimates the reflectivity information of the point cloud data based on the class information (C*D) and the regression information (R) about each class. The processor 150 may estimate the reflectivity information as a sum of the class information (C*D) about each point of the point cloud data and the regression information (R). For example, when, in response to one point of the point cloud data being classified into a second class, the class information (C*D) is detected as 0.2 (C*D=2*0.1=0.2) and the regression information (R) is detected as 0.03 (R=0.03), the processor 150 may estimate the reflectivity information (V) of the corresponding point as 0.23 (V=0.2+0.03=0.23). For example, the reflectivity information about each point of the point cloud data may be represented as shown in FIG. 7(b).

An operating method of the electronic device 100 according to various example embodiments may include acquiring image data and point cloud data, detecting physical information that includes location information and color information about each point of the point cloud data based on the image data, and detecting reflectivity information of the point cloud data by performing deep learning on the point cloud data based on the physical information.

According to various example embodiments, the detecting of the physical information may include detecting location information about each point of the point cloud data, and detecting color information of at least a portion of the point cloud data by overlapping the image data and the point cloud data.

According to various example embodiments, the detecting of the physical information may further include detecting at least a portion of the point cloud data as first point cloud data having color information, and detecting color information of at least a portion of second point cloud data of the rest of the point cloud data based on location information and color information of the first point cloud data.

According to various example embodiments, the detecting of the color information of the at least a portion of the second point cloud data may include generating a map using the first point cloud data, estimating a location of each point of the second point cloud data of the rest of the point cloud data based on the map, and assigning color information of a point cloud of the first point cloud data within a predetermined distance from at least one point of the second point cloud data to the at least one point.

According to various example embodiments, the detecting of the color information of the at least a portion of the second point cloud data may further include converting the at least one point to the first point cloud data, and after converting to the first point cloud data, returning to the generating of the map may be performed.

According to various example embodiments, the physical information may further include at least one of classification information of a surface for each point of the point cloud data and angle information about a plane that includes each point and surrounding points in the point cloud data.

According to various example embodiments, the classification information may include a 1D element, and each of the location information, color information and angle information may include 3D elements.

According to various example embodiments, the detecting of the reflectivity information may include converting the point cloud data to an image data format based on the physical information, and detecting the reflectivity information by performing deep learning on the converted point cloud data.

According to various example embodiments, the reflectivity information may be estimated as the sum of class information of each of a plurality of classes classified at a predetermined distance and regression information of the rest thereof.

According to various example embodiments, the reflectivity information may be estimated within a range of 0 or more and 1 or less.

Various example embodiments described herein may be implemented as software that includes one or more instructions stored in a storage medium (e.g., memory 140) readable by a machine (e.g., the electronic device 100). For example, a processor (e.g., processor 150) of the machine may call at least one of the stored one or more instructions from the storage medium and may execute the instruction. This enables the machine to perform at least one function according to the called at least one instruction. The one or more instructions may include a code generated by a compiler or a code executable by an interpreter. The device-readable storage medium may be provided in a form of a non-transitory storage medium. Here, the term "non-transitory" simply represents that the storage medium is a tangible device and does not include a signal (e.g., an electromagnetic wave). This term does not distinguish between a case in which data is semi-permanently stored in the storage medium and a case in which the data is transitorily stored in the storage medium.

A non-transitory computer-readable storage medium according to various example embodiments may store one or more programs to perform acquiring image data and point cloud data, detecting physical information that includes location information and color information about each point of the point cloud data based on the image data, and detecting reflectivity information of the point cloud data by performing deep learning on the point cloud data based on the physical information.

FIGS. 8(a)-(d), 9(a)-(d), 10(a)-(d), and 11(a)-(d) illustrate an operation effect of the electronic device 100 according to various example embodiments.

Referring to FIGS. 8(a)-(d), 9(a)-(d), 10(a)-(d), and 11(a)-(d), as illustrated in the (a) version of each of these figures, the electronic device 100 may perform deep learning on point cloud data converted to an image data format. Through this, as illustrated in the (b) version of each figure, the electronic device 100 may estimate reflectivity information of the point cloud data. Here, compared to actual reflectivity information as illustrated in the (c) version of each figure, the difference between the reflectivity information estimated in the electronic device 100 and the actual reflectivity information may be small as illustrated in the (d) version of each figure. That is, the reflectivity information estimated in the electronic device 100 may be very similar to the actual reflectivity information.

According to various example embodiments, the electronic device 100 may estimate reflectivity information of virtual point cloud data. Therefore, the electronic device 100 may tag information related to an object of a real environment using real image data and virtual point cloud data. That is, the electronic device 100 may accurately tag object-related information without using an actual LIDAR sensor.

The example embodiments and the terms used herein are not construed to limit the technique described herein to specific example embodiments and may be understood to include various modifications, equivalents, and/or substitutions. Like reference numerals refer to like elements throughout. As used herein, the singular forms "a," "an," and "the," are intended to include the plural forms as well, unless the context clearly indicates otherwise. Herein, the expressions, "A or B," "at least one of A and/or B," "A, B, or C," "at least one of A, B, and/or C," and the like may include any possible combinations of listed items. Terms "first," "second," etc., are used to describe various components and the components should not be limited by the terms. The terms are simply used to distinguish one component from another component. When a component (e.g., a first component) is described to be "(functionally or communicatively) connected to" or "accessed to" another component (e.g., a second component), the component may be directly connected to the other component or may be connected through still another component (e.g., a third component).

The term "module" used herein may include a unit configured as hardware, software, or firmware, and may be interchangeably used with, for example, the terms "logic," "logic block," "part," "circuit," etc. The module may be an integrally configured part, a minimum unit that performs at least one function, or a portion thereof. For example, the module may be configured as an application-specific integrated circuit (ASIC).

According to various example embodiments, each component (e.g., module or program) of the aforementioned components may include a singular entity or a plurality of entities. According to the example embodiments, at least one component among the aforementioned components or operations may be omitted, or at least one another component or operation may be added. Alternatively or additionally, the plurality of components (e.g., module or program) may be integrated into a single component. In this case, the integrated component may perform the same or similar functionality as being performed by a corresponding component among a plurality of components before integrating at least one function of each component of the plurality of components. According to various example embodiments, operations performed by a module, a program, or another component may be performed in parallel, repeatedly, or heuristically, or at least one of the operations may be performed in different order or omitted. Alternatively, at least one another operation may be added.

What is claimed is:

1. An operating method of an electronic device, the method comprising:
   acquiring image data and point cloud data;
   detecting physical information that includes location information and color information about each point of the point cloud data based on the image data; and
   detecting reflectivity information of the point cloud data by performing deep learning on the point cloud data based on the physical information; and
   wherein the reflectivity information is estimated as a sum of class information about each of a plurality of classes classified at a predetermined distance and regression information of the rest thereof.

2. The method of claim 1, wherein the detecting of the physical information comprises:
   detecting location information about each point of the point cloud data; and
   detecting color information of at least a portion of the point cloud data by overlapping the image data and the point cloud data.

3. The method of claim 2, wherein the detecting of the physical information further comprises:
   detecting at least a portion of the point cloud data as first point cloud data having color information; and
   detecting color information of at least a portion of second point cloud data of the rest of the point cloud data based on location information and color information of the first point cloud data.

4. The method of claim 3, wherein the detecting of the color information of the at least a portion of the second point cloud data comprises:
   generating a map using the first point cloud data;
   estimating a location of each point of the second point cloud data of the rest of the point cloud data based on the map; and
   assigning color information of a point cloud of the first point cloud data within a predetermined distance from at least one point of the second point cloud data to the at least one point.

5. The method of claim 4, wherein the detecting of the color information of the at least a portion of the second point cloud data further comprises:
   converting the at least one point to the first point cloud data, and
   after converting to the first point cloud data, returning to the generating of the map.

6. The method of claim 1, wherein the physical information further includes at least one of classification information of a surface for each point of the point cloud data and angle information about a plane that includes each point and surrounding points in the point cloud data.

7. The method of claim 6, wherein:
   the classification information includes a one-dimensional (1D) element, and
   each of the location information, the color information, and the angle information includes three-dimensional (3D) elements.

8. The method of claim 1, wherein the detecting of the reflectivity information comprises:
   converting the point cloud data to an image data format based on the physical information; and detecting the reflectivity information by performing deep learning on the converted point cloud data.

9. The method of claim 1, wherein the reflectivity information is estimated within a range of 0 or more and 1 or less.

10. An electronic device comprising:
a camera module;
a memory; and
a processor configured to connect to each of the camera module and the memory, to acquire image data through the camera module, and to acquire point cloud data stored in the memory,
wherein the processor is configured to:
detect physical information that includes location information and color information about each point of the point cloud data based on the image data,
detect reflectivity information of the point cloud data by performing deep learning on the point cloud data based on the physical information,
detect location information about each point of the point cloud data,
detect color information of at least a portion of the point cloud data by overlapping the image data and the point cloud data,
detect at least a portion of the point cloud data as first point cloud data having color information, and
detect color information of at least a portion of second point cloud data of the rest of the point cloud data based on location information and color information of the first point cloud data.

11. The electronic device of claim 10, wherein the processor is configured to:
generate a map using the first point cloud data,
estimate a location of each point of the second point cloud data of the rest of the point cloud data based on the map,
assign color information of a point cloud of the first point cloud data within a predetermined distance from at least one point of the second point cloud data to the at least one point, and
convert the at least one point to the first point cloud data and thereby update the map.

12. The electronic device of claim 10, wherein the physical information further includes at least one of classification information of a surface for each point of the point cloud data and angle information about a plane that includes each point and surrounding points in the point cloud data.

13. The electronic device of claim 12, wherein:
the classification information includes a one-dimensional (1D) element, and
each of the location information, the color information, and the angle information includes three-dimensional (3D) elements.

14. The electronic device of claim 10, wherein the processor is configured to:
convert the point cloud data to an image data format based on the physical information, and
detect the reflectivity information by performing deep learning on the converted point cloud data.

15. The electronic device of claim 10, wherein the reflectivity information is estimated as a sum of class information about each of a plurality of classes classified at a predetermined distance and regression information of the rest thereof.

16. The electronic device of claim 15, wherein the reflectivity information is estimated within a range of 0 or more and 1 or less.

17. A non-transitory computer-readable storage medium storing one or more programs to perform:
acquiring image data and point cloud data;
detecting physical information that includes location information and color information about each point of the point cloud data based on the image data;
detecting reflectivity information of the point cloud data by performing deep learning on the point cloud data based on the physical information;
detecting location information about each point of the point cloud data;
detecting color information of at least a portion of the point cloud data by overlapping the image data and the point cloud data;
detecting at least a portion of the point cloud data as first point cloud data having color information; and
detecting color information of at least a portion of second point cloud data of the rest of the point cloud data based on location information and color information of the first point cloud data.

* * * * *